US006971012B1

(12) United States Patent
Shimizu et al.

(10) Patent No.: US 6,971,012 B1
(45) Date of Patent: Nov. 29, 2005

(54) MOTION PICTURE ELECTRONIC WATERMARK SYSTEM

(75) Inventors: Shuichi Shimizu, Yokohama (JP); Akio Koide, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/534,097

(22) Filed: Mar. 23, 2000

(30) Foreign Application Priority Data

Mar. 23, 1999 (JP) .................................. 11-077540

(51) Int. Cl.[7] ............................................. H04L 9/00
(52) U.S. Cl. ..................... 713/176; 382/100; 380/205; 380/235; 358/1.18
(58) Field of Search ................. 713/176; 382/100; 708/403; 380/205, 235, 10; 358/1.18

(56) References Cited

U.S. PATENT DOCUMENTS

| | | | | |
|---|---|---|---|---|
| 5,960,081 A | * | 9/1999 | Vynne et al. | 713/176 |
| 6,088,123 A | * | 7/2000 | Adler et al. | 358/3.28 |
| 6,163,842 A | * | 12/2000 | Barton | 713/176 |
| 6,252,972 B1 | * | 6/2001 | Linnartz | 382/100 |
| 6,421,450 B2 | * | 7/2002 | Nakano | 382/100 |
| 6,505,223 B1 | * | 1/2003 | Haitsma et al. | 708/403 |

FOREIGN PATENT DOCUMENTS

| | | |
|---|---|---|
| WO | WO96/42151 | 7/1996 |
| WO | WO00/4722 | 1/2000 |

* cited by examiner

*Primary Examiner*—Kim Vu
*Assistant Examiner*—Thanhnga Truong
(74) *Attorney, Agent, or Firm*—Thomas A. Beck; Louis P. Herzberg

(57) ABSTRACT

To provide an electronic watermark method and system for which the detection reliability of embedded information does not depend on the strength of signals that are measured in frames.

To achieve the above object, information is prepared for embedding as a bit stream, the sign of the bit stream being changed in accordance with a sign inversion cycle, and the bit stream being embedded in a frame.

As for detection of information, values obtained through observation of frames are accumulated, and the accumulated values are compared with threshold values that are varied in accordance with the accumulated values obtained by observation. The comparison results are then employed to detect the embedded information.

15 Claims, 9 Drawing Sheets

$$U[i] = \frac{1}{\sqrt{f}}(V\_(k+1)[i]) + (V\_(k+2)[i]) + ... + (V\_(k+f)[i])$$

Fig. 13

MOTION PICTURE ELECTRONIC WATERMARK SYSTEM

FIELD OF THE INVENTION

The present invention relates to an electronic watermark technique for embedding additional invisible information in digital motion pictures, and in particular, to a detection technique for which accumulation of signals is used to achieve detection providing a high level of reliability, even when the embedded signal is weak.

BACKGROUND ART

Generally, since the resolution of a motion picture is higher than that of a still picture, a signal embedded in a motion picture must be weaker than is a signal embedded in a still picture so that image quality can be maintained. Even if a strong signal is embedded, it is considerably attenuated after being subjected to a low-pass filter or to MPEG2 compression. Therefore, in a method for detecting signals independently in each frame, or a method for detecting signals in a fixed number of frames, since the strength of the signals to be measured depends on the compression process, the reliability of the detection is not always high. If a threshold value for enhancing the reliability is set, another problem arises that embedded signals can not be detected at all (false negatives).

A method is required whereby the reliability of the detection does not depend on the strength of a signal that is measured in a single frame. However, means for resolving the problem are not taught in the "data hiding method and data extraction method employing statistical inspection" disclosed in Japanese Patent Application No. Hei 8-348426, the "data hiding method and system employing statistical property" disclosed in Japanese Patent Application No. Hei 8-345568, and the "multiple frame data hiding method and detection method" disclosed in Japanese Patent Application No. Hei 9-88493.

PROBLEMS TO BE SOLVED BY THE INVENTION

It is, therefore, one object of the present invention to provide an electronic watermark method and system for which the detection reliability of embedded information does not depend on the strength of signals that are measured in frames.

It is another object of the present invention to provide an electronic watermark detection method and system for detecting embedded information based on a statistical observation value for each motion picture frame.

It is an additional object of the present invention to provide an electronic watermark detection method and system for changing a sign before accumulating a value obtained through observation of a motion picture frame.

It is a further object of the present invention to provide an electronic watermark detection method and system that can cancel a correlation (dependency) of sequential motion picture frames.

It is still another object of the present invention to provide an electronic watermark method and system for changing a sign of a signal to be embedded before information is embedded.

It is still an additional object of the present invention to provide an electronic watermark method and system for changing the signs of embedded signals at specific intervals.

It is a still further object of the present invention to provide an electronic watermark detection method and system for preventing an increase in a difference between sequential motion picture frames.

It is yet another object of the present invention to provide an effective method and system for a compression method, such as MPEG2 by using a difference.

It is yet an additional object of the present invention to provide a method and system with which synchronization, as it is related to signs, of an embedding process and a detection process is not required.

It is another object of the present invention to provide, for an information embedding process and a detection process, a method and a system for which positron synchronization is not required.

It is an additional object of the present invention to provide an electronic watermark method and system that can also cope with great changes in the reproduction speeds used for motion pictures.

It is a further object of the present invention to provide, at a low cost, an electronic watermark method and system for detecting watermark information.

SUMMARY OF THE INVENTION

To achieve the above objects, information is prepared for embedding as a bit stream, the sign of the bit stream being changed in accordance with a sign inversion cycle, and the bit stream being embedded in a frame.

Figure 1:
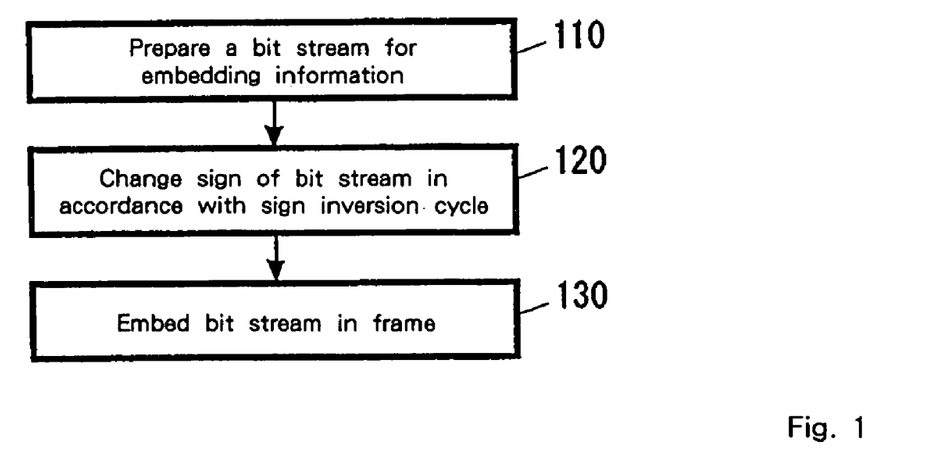
FIG. 1 is a flowchart for the information embedding processing according to the present invention.

FIG. 1 is a flowchart for the information embedding process according to the present invention. First, block 110 is a bit stream preparation block at which information is prepared for embedding as a bit stream. Block 120 is a bit stream sign change block at which the sign of a bit stream is changed in accordance with a sign inversion cycle. Finally, block 130 is a bit stream embedding block at which a bit stream is embedded in a motion picture frame.

As for detection of information, values obtained through observation of frames are accumulated, and the accumulated values are compared with threshold values that are varied in accordance with the accumulated values obtained by observation. The comparison results are then employed to detect the embedded information.

Figure 2:
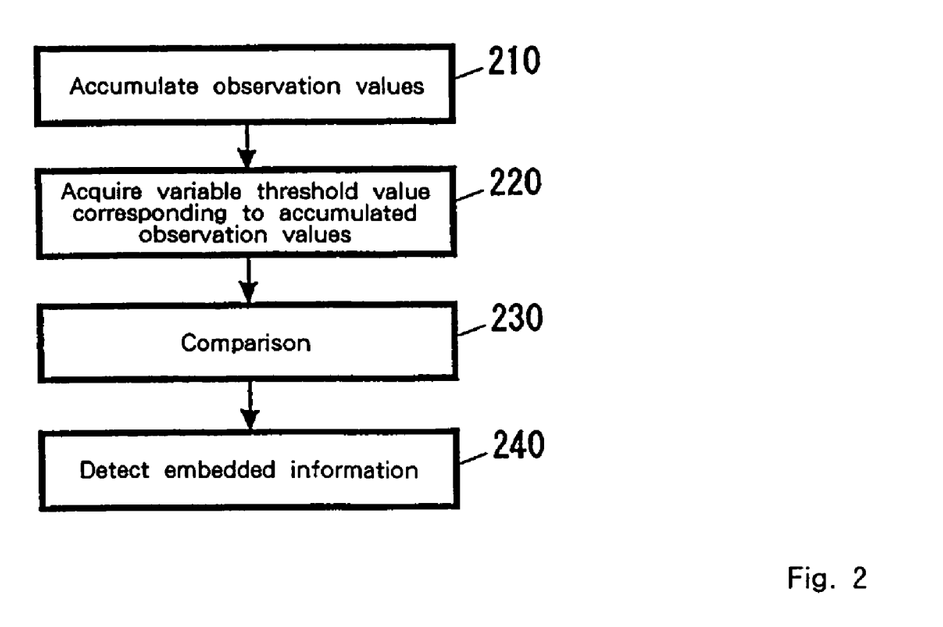
FIG. 2 is a flowchart for the information detection processing according to the present invention.

FIG. 2 is a flowchart showing the detection of information according to the present invention. Block 210 is an observation accumulation block at which values obtained by observation of frames are accumulated. Block 220 is a variable threshold value acquisition block at which variable threshold values are acquired corresponding to the accumulated values. Block 230 is a comparison block at which the accumulated values obtained by observation are compared with variable threshold values that correspond to the accumulated values. Finally, block 240 is an information detection block at which embedded information is detected in accordance with the comparison results.

ADVANTAGES OF THE INVENTION

A strong copy control signal must be embedded and hidden in DVD picture data to prevent the copy control signal from being erroneously read by a device. However, since the resolution of motion pictures is generally higher than that of still pictures, such an embedded, strong signal may be detected as noise. According to the method and the system of the present invention, instead of embedding a strong signal, signals that are weak enough to maintain the quality are embedded in frames and are accumulated until the signal strength reaches a satisfactory high level for detection purposes. Thus, the same reliability for extraction can be obtained as when strong signals are embedded.

While the DVD picture format is the MPEG2 format, a problem whereby an embedded signal is attenuated by this compression method by which a hidden signal may be lost can be resolved by employing the accumulation method and system of the present invention.

PREFERRED EMBODIMENT

According to an electronic watermark method using statistical probability properties for values obtained by observation (disclosed in Japanese Patent Application No. Hei 8-348426 and No. Hei 8-345568), m values (V[1], V[2], . . . ; V[m]), the value for each frame is measured from each frame and interpreted as bit information to accomplish the embedding/detection of m bits. In this case, it is assumed that the values obtained by observation of frames having no embedded information, i.e., values for noise observed as signals, can be approximated using the normal distribution. If the approximation to the normal distribution is correct, such a false positive error that noise is interpreted as a signal can be predicted, and the threshold value T can be determined in order to adjust the error rate to that of a target value.

The bit information can be embedded in an image by processing image data so that the individual observation values (|V[i]|) extend beyond the threshold value T. However, |V[i]| does not always exceed the threshold value T because it is attenuated by the effect of the compression process, or is attenuated in order to maintain the image quality. In this case, a false negative error occurs such that an embedded signal can not be detected even though it is present.

Figure 13:
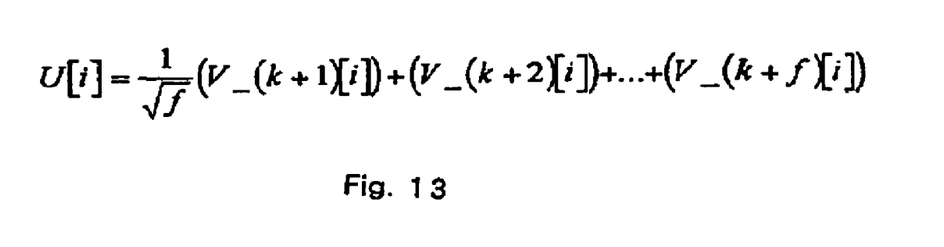
FIG. 13 is an equation for carrying values obtained by observation of a frame to a succeeding frame and for determining the presence of an embedded signal using the sum of two values.

To resolve this problem, provided is a method for carrying the value obtained by observation of a frame to a succeeding frame and for determining the presence of an embedded signal using the sum of the two values. When two frames are not adequate, the number of frames observed is increased and signals are accumulated in order to determine the presence of a signal. As an assumption in this case, the values obtained by observation of the individual frames must be consonant with their normal distribution and must be independent of each other. When f random variables that are independent and are consonant with the normal distribution of variance 1 are added together, the result is a random variable for variance f. Therefore, it is predicted that the accumulated value of noise obtained by observation will be increased at a speed in proportion to $\sqrt{f}$. This phenomenon can be generally regarded as a random walk. On the other hand, since the value of a signal obtained by observation is intentionally provided so that it will not be distributed, the value obtained by observation is expected to increase in proportion to f. Thus, when the accumulated value U[i] is normalized by dividing it by $\sqrt{f}$:

$$U[i] = \frac{1}{\beta}(V\_(k+1)[i]) + (V\_(k+2)[f]) + \ldots + (V\_(k+f)[i]))$$ FIG. 13 wherein a value for noise obtained by observation can be regarded as a random variable having the normal distribution of variance 1. V_j[i] represents the statistical value of the i-th bit obtained by observation of the j-th frame, and can, therefore, be compared with the fixed threshold value T. Since the accumulated value U[i] for a signal is increased in proportion to $\sqrt{f}$, so long as f is satisfactorily large, the value U[i] can exceed the fixed threshold value T. According to this method, even when an embedded signal is considerably attenuated so long as the signs for the values accumulated for the frames are substantially uniform, the false negative error can be approximated and brought as close as zero by increasing the number of accumulated frames,

* Exclusion of Correlation of Sequential Frames

Generally, sequential motion picture frames strongly correlate with each other. In other words, because frames differ little from each other and strongly correlate with each other, they can be replayed as motion pictures. In an extreme case, the correlation coefficient is the maximum for motion pictures in which the same contents are repeated. In this case, an assumption that the accumulated value U[i] follows the normal distribution for variance 1 is not established. Therefore, a process for canceling the correlation is required.

In this process, when the observation values obtained from the individual frames are added together, the order of their signs is inverted. Then, even when the same contents are repeated, the accumulated value U[i] is not increased and oscillates a little around 0, and its amplitude is reduced in proportion to $1/\sqrt{f}$. Further, if the signs of the observation values that are independent of each other are inverted, their independence is not affected. In the embedding process, as well as in the detection process, the signs of the signals to be embedded are sequentially inverted.

Figure 3:
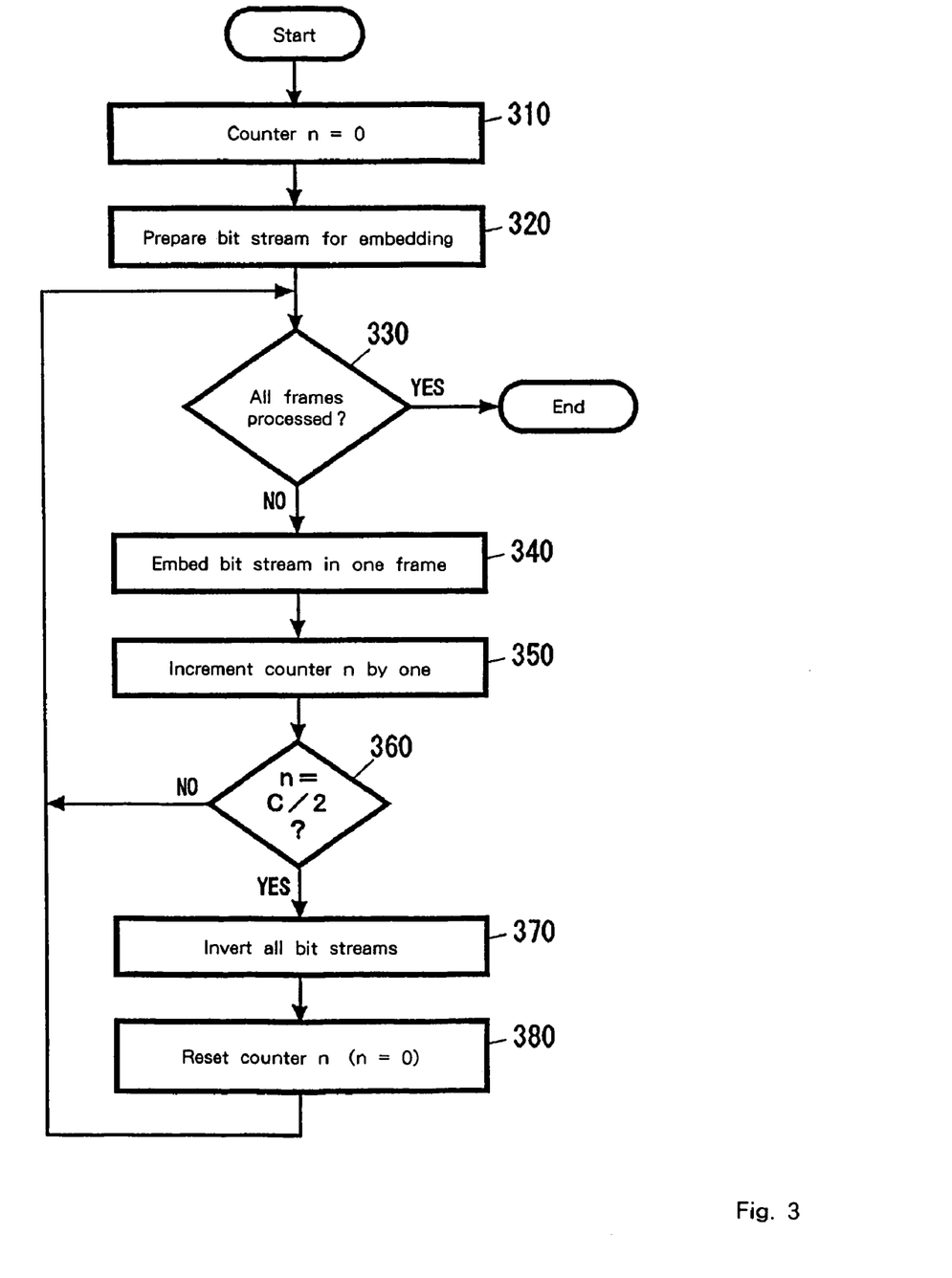
FIG. 3 is a flowchart for embedding processing where the sign of an embedded signal is changed in accordance with the sign inversion cycle.

FIG. 3 is a flowchart showing the embedding processing by which the sign of an embedded signal is changed in accordance with a sign inversion cycle. One sign inversion cycle, as well as a wave cycle, is defined as a set comprising a half cycle of + and a half cycle of –. In other words, with a wavelength of 10, the sign is changed at the step of the wavelength for 5. Since in FIG. 3 the sign inversion cycle is defined as C, the sign is inverted every C/2 cycle and information is embedded. At step 310 a counter n is set to 0. At step 320 a bit stream is prepared for embedding, and at step 330 a check is performed to determine whether all the frames have been processed. If the decision is YES, the processing is thereafter terminated. If the decision is NO, program control moves to step 340. At step 340, the bit stream is embedded in one frame, and at step 350 the counter n is incremented by one. At step 360 a check is performed to determine whether the sign inversion cycle has been reached. If the decision is NO, program control returns to step 330. If the decision is YES, program control advances to step 370, whereat the bit stream is inverted. At step 380 the counter n is reset, and program control thereafter returns to step 330.

* Avoid Bit Interpretation Inversion Due to Addition of a Sign Bit

In a method for employing the sign of the observation value U[i] to interpret a bit, i.e., for interpreting a bit as "1" when the sign is positive and as "0" when the sign is negative, synchronization concerning the sign is required for the embedding process and the detection process, although it is difficult to synchronize the two processes. Otherwise, the interpreted bit is inverted (e.g., from "101" to "010") and causes an erroneous interpretation.

Thus, the method is provided for adding a sign bit to bits to be embedded and for embedding a total of m+1 bits. A bit having the same sign as the sign bit is interpreted as a bit "1," and a bit having the opposite sign is interpreted as a bit "0" to prevent bits from being inverted. When, for example, "101+1" is inverted and becomes "010+0," the interpreted bit is "101" since the sign bit is "0." As is described above, the property is employed whereby all of m+1 bits are inverted when the sign is inverted.

* Sign Inversion for a Long Cycle and Observation for Every Half Cycle

When the sign for the embedded process is changed for two sequential frames, a difference between the two frames is double that in the embedding process. The increase in the difference between the two sequential frames greatly affects a compression method, such as MPEG2, that employs a difference, and causes deterioration of the compression rate. When a filter is employed that removes noise to reduce the difference between the sequential frames, an embedded signal will be considerably attenuated and lost.

Figure 6:
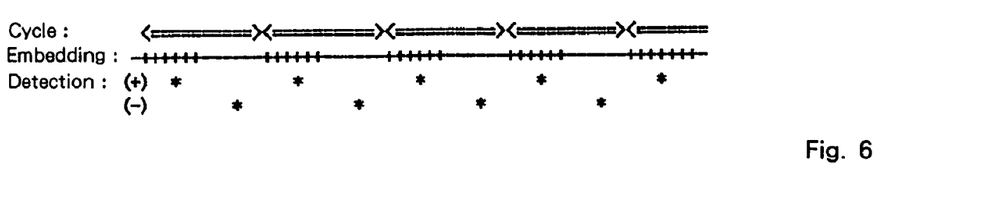
FIG. 6 is a diagram showing sign inversion for a long cycle and an observation method employed every half cycle.

To avoid this problem, the sign inversion cycle C must be extended in order to prevent the change between adjacent frames. The observation is performed every half cycle (C/2), and when the values obtained by observation are accumulated with changed signs, as is shown in FIG. 6, embedded signals can be collected.

Figure 4:
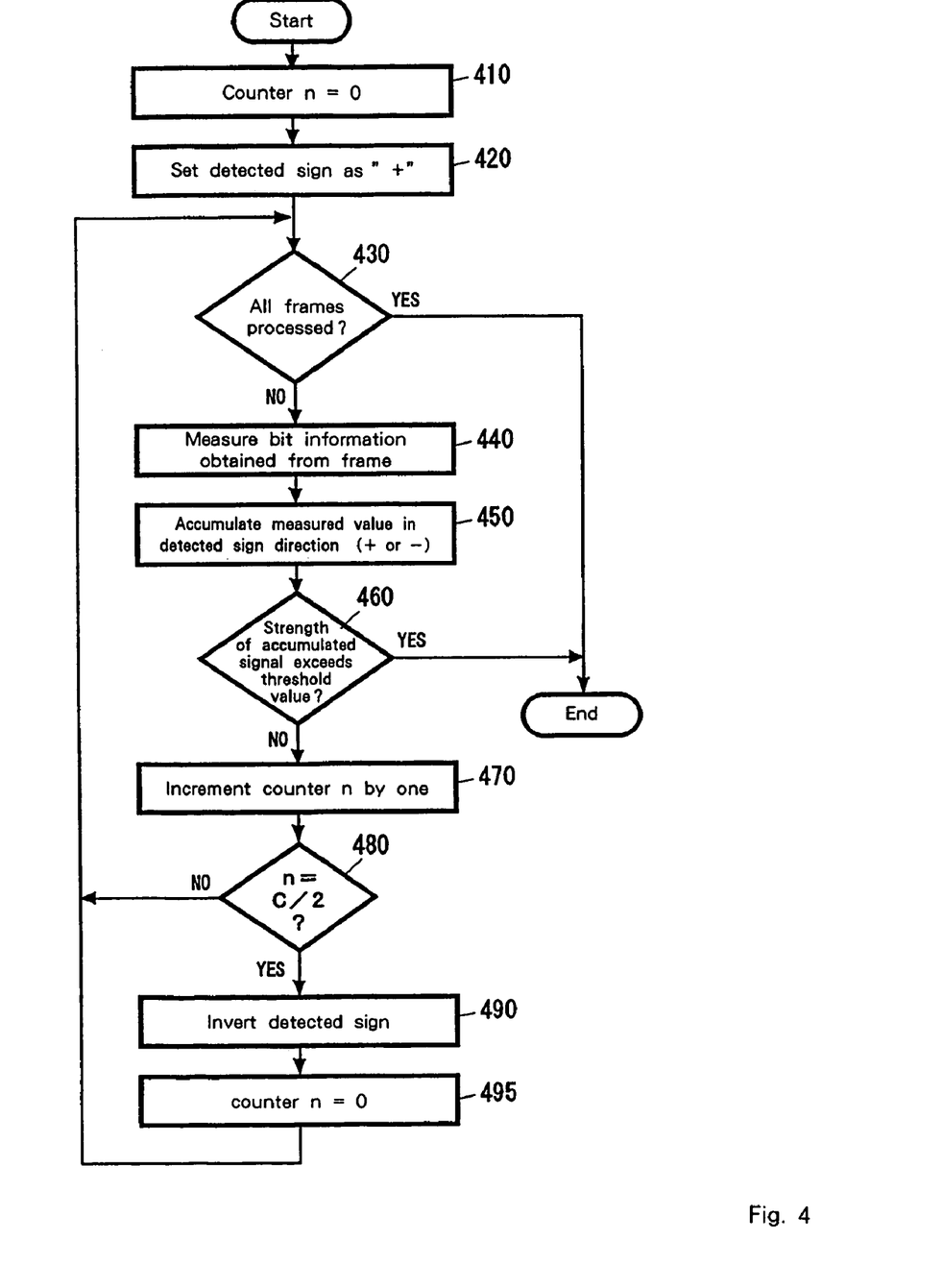
FIG. 4 is a flowchart for sign inversion for a long cycle and signal detection obtained by observation every half cycle.

FIG. 4 is a flowchart for sign inversion for a long cycle, and the detection of signals through observations performed every half cycle. At step 410 the counter n is set to 0. At step 420 the sign for detection is set to "+," and at step 430 a check is performed to determine whether all the frames have been processed. When the decision is YES, the processing is thereafter terminated. When the decision is NO, program control moves to step 440, whereat bit information in a frame is measured. Then, at step 450 the measured value is accumulated in the direction of the detection sign ("+" or "–"). At step 460 a check is performed to determine whether the strength of the accumulated signal exceeds the threshold value. If the decision is YES, the processing is thereafter terminated. If the decision is NO, program control advances to step 470, whereat the counter n is incremented by one. At step 480, a check is performed to determine whether the sign inversion cycle is reached. If the decision is NO, program control returns to step 430. If the decision is YES, program control moves to step 490, whereat the detected sign is inverted, and then to step 495, whereat the counter n is reset to 0. Program control thereafter returns to step 430.

* Accumulation Method 1 Employed when an Embedding Cycle and a Detection Cycle are not Synchronized For the MPEG2 compression, self-replaying compression is performed for only the I frame of the I, P and B frames, and compression using a difference is performed for the other two frames. Thus, the detection performed by observing only the I frame is preferable as far as the cost is concerned; however, according to the MPEG2 standards, the cycle in which the I frame appears is not fixed but is variable, and is, therefore, not always synchronized with the cycle of the embedded signal. If the cycles do not match, the signs cancel each other out the accumulative effect is not obtained.

Figure 7:
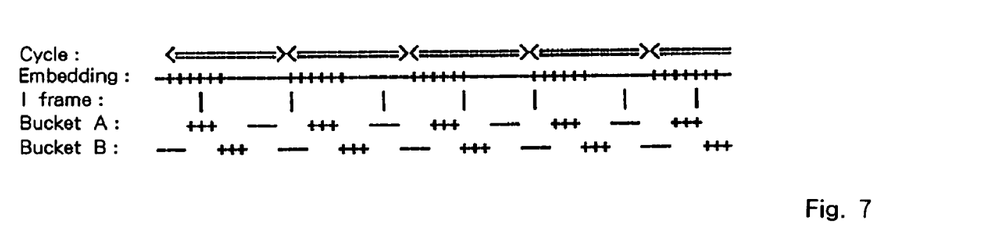
FIG. 7 is a diagram showing an accumulation method when an embedding cycle and a detection cycle do not match.

In order to accumulate the frames without canceling the sign, two accumulation buckets A and B are prepared. The frames are alternately accumulated in the buckets, as is shown in FIG. 7, in order to collect in at least one bucket the frames whose signs are synchronized.

For example, the first I frame with the + sign is loaded into bucket A, and the second I frame with the – sign is loaded into bucket B. Since bucket B extends over the boundary at which an embedded sign is changed, when the second and the fourth frames are accumulated, they have opposite signs and cancel each other out, even though they have the same sign when collected. On the other hand, since the cycle of the signs collected in bucket A is not shifted away from the embedding cycle, exact values for the frames I can be collected in bucket A. Since no signs are shifted for bucket A, the three signs are collected in bucket A, while since one sign is shifted for bucket B, only one sign is collected after the signs are canceled.

Figure 5:
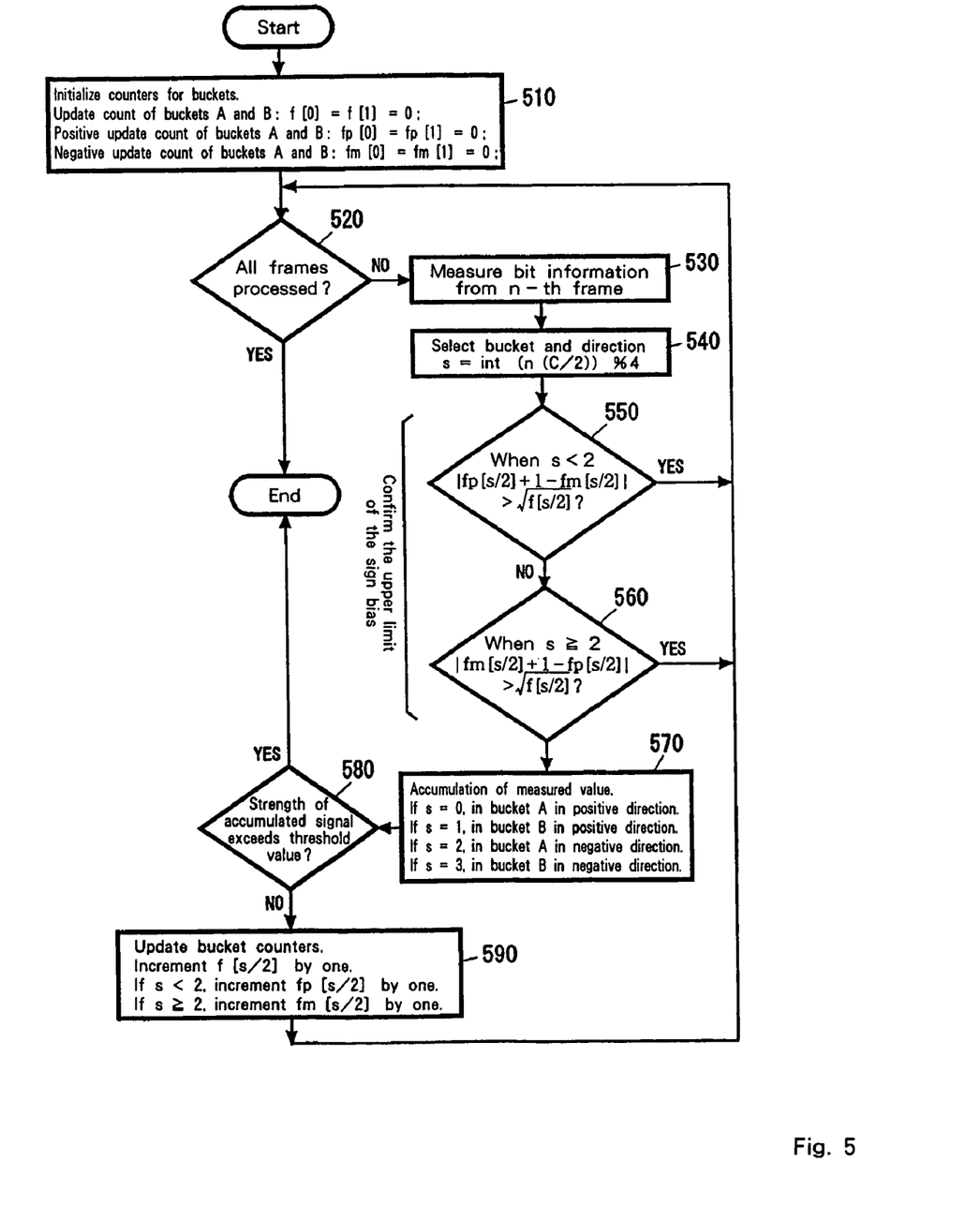
FIG. 5 is a flowchart for signal detection using the accumulation method when an embedding cycle and a detection cycle are not synchronized.

FIG. 5 is a flowchart for signal detection using an accumulation method when the embedding cycle and the detection cycle are not synchronized. First, at step 510 the count for the bucket is initialized while the sign inversion cycle is C. In this process, the arrangements that represent update counts for buckets A and B, the positive update counts for buckets A and B, and the negative update counts for buckets A and B are initialized. At step 520 a check is performed to determine whether all the frames have been processed. If the decision is YES, the processing is thereafter terminated. If the decision is NO, program control advances to step 530. At step 530 bit information is measured starting from the n-th frame and at step 540 the accumulation bucket and the direction are determined. At step 550 the upper limit of the sign bias when S is smaller than 2 is confirmed. Similarly, at step 560 the upper limit of the sign bias when S is equal to or greater than 2 is confirmed. When the decision at step 550 or step 560 is YES, program control returns to step 520. When no limit is established for the sign bias, program control advances to step 570, whereat the measured value is accumulated. When the measured value is s=0, it is accumulated in bucket A in the positive direction (addition);

when s=1, the measured value is accumulated in bucket B in the positive direction (addition); when s= 2, the measured value is accumulated in bucket A in the negative direction (subtraction); and when s=3, the measured value is accumulated in bucket B in the negative direction (subtraction). At step 570 a check is performed to determine whether the strength of the accumulated signal has exceeded the threshold value. When the result is YES, the processing is thereafter terminated. If the result is NO, program control advances to step 590, whereat the counter for the bucket is updated. Program control thereafter returns to step 520.

Figure 8:
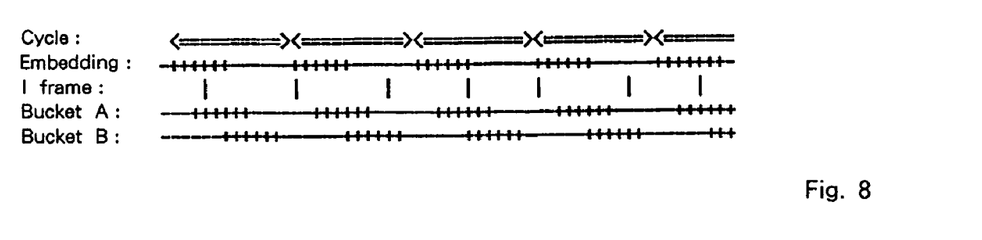
FIG. 8 is a diagram showing another accumulation method when an embedding cycle and a detection cycle do not match.

* Accumulation Method 2 when the Embedding Cycle and the Detection Cycle are not Synchronized In the above method, the two buckets are exclusively employed so as not to overlap as time elapses. In FIG. 8 is shown a method for a ¼ shift of the cycles for the two buckets and the overlapping of the buckets for use. For example, since only two of six signs are shifted a half cycle for bucket A, two remain after subtraction of the canceled signs. On the other hand, since only one of six signs is shifted for bucket B, four remain after the canceling of the signs. That is, it is apparent that at least one of the buckets can collect more than half of the signs. Generally, this collection capacity is higher than the exclusive collection capacity that was described for the previous method.

* Upper Limit for Restricting the Bias of Accumulated Signs

In the above two methods, the frames with inverted signs are not always alternately accumulated. When the frames with the same sign are accumulated sequentially, the canceling of correlation by the inversion of signs can not be performed, and the false/positive error ratio can not be predicted. To eliminate this problem, the accumulation of I frames must be skipped when this precipitates a bias in the accumulated signs. Whether a bias exists is determined by the following expression:

$$|fp-fm| <= \sqrt{f},$$

where fp and fm denote the number of frames having the signs + and −, and f denotes the sum (fp+fm). Since noise is accumulated at the speed √f, as described above, so long as a difference |fp−fm| does not exceed that speed, the accumulation of frames having the same sign will not adversely affect the false/positive prediction.

Furthermore, according to the present invention, the following method for detecting watermark information at a low cost is used in accordance with reproduction speeds (so as to be able to cope with great changes in the reproduction speeds) used for motion pictures.

(1) When a relative positional relationship between embedded information and detected information does not exist (positions do not match), a periodical detection mask is employed that is not sensitive to the non-matching (the shifting) of positions, and so that less memory and fewer calculations are required for a search performed to find a match, the search range is narrowed by limiting the target data to inner product values.

(2) Since detection will be successful, even if the position of the embedded information is changed due to (1), the history of the above relative positional relationship is used to remove an overlapping positional relationship, so that a correlation that exists among sequential frames in a motion picture is eliminated.

(3) A position synchronization signal and a signal for expressing a bit are separated, and bit signals are employed in the descending order of the intensity of the position synchronization signal, so that the accumulation efficiency is enhanced.

The fast detection process and the method for removing motion picture correlation will now be described in more detail.

According to data hiding [1,2], copyright information and copy control information are inserted as an electronic watermark by adding an embedding pattern (P) to the original contents (I). When a two-dimensional motion picture arrangement constitutes the contents, this process is carried out by the addition of the two-dimensional arrangement.

$$I':=I+P$$

For the detection of an electronic watermark, a detection mask (M) that strongly correlates with the embedding pattern is used to measure a correlation (X) with the target contents (J).

$$X = J \text{ dot } M = I \text{ dot } M \quad (J = I, \text{ unmarked}) \text{ OR}$$
$$I \text{ dot } M + P \text{ dot } M \quad (J = I', \text{ marked})$$

In the above equation, "dot" is an operator that represents an inner product. When M is so selected that "I dot M" in the first term on the right is always small, a correlation X is a small value close to 0 when an electronic watermark is not embedded (unmarked). When an electronic watermark is embedded (marked), "P dot M" in the second term has a large value, so that the presence of an electronic watermark can be detected by inspecting the value of X. Generally, if the contents of the detection mask M are selected at random, the detection mask M can be prepared so that the value of the first term "I dot M" is close to 0, regardless of the contents (J).

The detection mask has a fixed pattern, regardless of the contents, whereas the embedding pattern must be prepared by adjusting it in accordance with the contents I, while maintaining the strong correlation with the detection mask M, so that the detection mask does not affect the original picture quality and tone quality. However, to simplify the explanation, hereinafter both the embedding pattern and the detection mask are fixed and are used as identical patterns.

First, an explanation will be given for a method used for the fast processing, at a low cost, of a shift position whereby the shifting transformation resistance is carried out.

Assume that (geometrical) positions are shifted between the detection mask M and the target contents J. Generally, shifting is due to a transmission performed between the embedding process and the detection process, to a change in the floating position of a horizontal (16:9, LetterBox) motion picture, or to a malicious operation, such as a hacking attack. An embedding and detection method that is not at all affected by shifting is a method uses frequency space, such as a Fourier transform or a DCT transform. According to an example method, a Fourier frequency transform is performed for the contents to separate them into a power (strength) element and a phase element. The effect produced by the shifting affects only the phase element, i.e., it does not affect the power element, and this fact is used to perform embedding and detection only for the power element. However, since the cost of the calculations for the frequency transform is generally high, this method can not be used when real-time detection is required at a speed corresponding to that at which a motion picture is reproduced. According to the embedding and detection method based on a pixel located in a spacial area, the first term "I dot M" has a small value, regardless of the positional shifting. However, although an electronic watermark still remains, a large effect can not be provided by the second term "P dot M" due to the shifting (mis-alignment), and the entire right side has a small value. As a result, the detection of the electronic watermark fails. To avoid this, the position whereat the maximum effect is obtained (the shifting position when information is marked) must be searched for by using tests performed to find the correct position (alignment).

However, were a such a search be made based on pixel units, 345,600 attempts would be required for an image of, for example, 720×480 pixels, and this would not be realistic from the viewpoint of the number of calculations would be required.

If the alignment is not enabled by inspecting each pixel, but by a search of each of a number of small areas, the number of searches required can be reduced considerably. Therefore, according to the present invention, first, the following 8×4 block patterns (p0 to p3) are used so that the detection process is rendered insensitive relative to the shifting.

| ++++++++ | 00000000 | -------- | 00000000 |
| 00000000 | ++++++++ | 00000000 | -------- |
| -------- | 00000000 | ++++++++ | 00000000 |
| 00000000 | -------- | 00000000 | ++++++++ |
| p0 | p1 | p2 | p3 |

An arrangement wherein a plurality of one of these blocks are arranged horizontally and vertically, i.e., as a 2×4 block, is used as a primary pattern to form an embedding pattern and a detection mask. Here, "+" represents +1 and "−" represents −1. Hereinafter, the above block pattern is called a primitive pattern. The basic pattern P0 formed by the primitive pattern p0, for example, a 2×4 primitive pattern, is as follows.

```
    <--  16 pixels  -->
    ++++++++++++++++              ^
    0000000000000000              |
    ----------------              |
    0000000000000000           16 pixels
         ...                      |
    ++++++++++++++++              |
    0000000000000000              |
    ----------------              |
    0000000000000000              v
           P0
```

The thus prepared primitive patterns P0 to P3 are arranged at random to form a detection mask (an embedding pattern).

$$M \text{ (or } P) = \begin{pmatrix} P0 & P2 & P1 & P0 & P3 & \ldots & P2 \\ P2 & P3 & \ldots & & & & . \\ . & \ldots & & & & & . \\ . & \ldots & & & & & . \\ P1 & \ldots & & & & & P3 \end{pmatrix}$$

When M and P are shifted one pixel column horizontally, the column at the end of each primitive pattern overlaps the adjacent pattern. Further, since the columns of the primitive pattern are arranged at random, assuming that on average there is no contribution to the inner product of the overlapping portion, 1/16 of the entire inner product is lost. In this case, assume that the end portions outside the pattern area are folded so that they can be connected vertically and horizontally. Similarly, 2/16 of the value of the inner product is lost when a shift of two columns is performed, and 3/16 of the value of the inner product is lost when a shift of three columns is performed. When M and P are shifted by eight columns, half of the inner product is lost. However, if the shifting is performed as a unit comprising a primitive pattern (eight pixel columns horizontally), the value of the shift is 0, so that the loss is also 0. Therefore, if a search of each of the primitive patterns is performed, the maximum loss position is one at which the remainder following a shift is 4, and 4/16=25% of the inner product is lost.

When M and P are shifted two rows vertically, two rows of the adjacent pattern are overlapped, and therefore, 2/16 of the inner product is lost. If M and P are shifted only one row, however, a 0 and a non-0 overlap each other, so that the reduction of the value of the inner product is 0. In this invention, in order to avoid this, not only the mask M but also a mask M' that is shifted one row vertically is used. The mask M' is formed by replacing, in the primitive pattern, p0 with p1, p1 with p2, p2 with p3, and p3 with p0. When one cycle represents a vertical shift of four rows, it can be assumed that the detection mask M' has a phase that is equivalent to 1/4 the cycle (90 degrees) of the detect-ion mask M.

$$M' = \begin{pmatrix} P1 & P3 & P2 & P1 & P0 & \ldots & P3 \\ P3 & P0 & \ldots & & & & . \\ . & \ldots & & & & & . \\ . & \ldots & & & & & . \\ P2 & \ldots & & & & & P0 \end{pmatrix}$$

The detection mask M' produces a loss of 0 when one row is shifted, and when M and P are shifted three rows, the loss is 2/16. But when M and P are shifted four rows, the shifting performed is the equivalent of one primitive pattern unit and the loss is 0, so that the maximum loss is 1/16 when the remainder following a vertical shift is 2. Therefore, when the remainder following a horizontal shift (mod 8) is 4 and the remainder following a vertical shift (mod 4) is 2, the maximum loss is 1−(1−4/16)×(1−2/16)=34.4%.

As is described above, when during a search for the correct shifting position the areas inspected are primitive pattern units, the effect produced by an electronic watermark can be obtained with a loss of 35% at most. At this time, the number of searches is only 1/(8×4)×2=1/16 the number that would be required were individual pixels inspected, even when the employment of both the masks M and M' is taken into consideration. Furthermore, if the inner product is calculated once in advance as an 8×4 primitive pattern unit, the obtained inner product value can be used thereafter, and the memory required will be considerably reduced. As a result, an electronic watermark detection chip can be prepared incorporating in a DVD drive. That is, if a tile-shaped portion is obtained by dividing a 720×240 field image (172,800 bytes) into nine segments (3×3) and by superimposing the segments, the tile-shaped portion can be represented by an inner product value of only (720/3/8)×(240/3/4)×2×2 bytes=2400 bytes, instead of a pixel value. In addition, a realistic search range is obtained, which is (720/3/8)×(240/3/4)×2=1200 positions. This is because an I frame that appears approximately twice in one second is processed by being directly detected in an MPEG2 stream, and 0.5 second is much too long when trying to search 1200 positions twice.

The method for eliminating the correlation of motion pictures will now be described.

A "frame accumulation" method [4] is a countermeasure for a case wherein the output for each frame is low during a process for detecting an electronic watermark in a motion picture. The output for each frame is accumulated and when the accumulated value reaches a threshold value, it is determined that a mark is present. If the accumulated value does not reach the threshold value within a defined interval (time), it is ascertained that no mark exists. When noise that occurs at random is accumulated, random walking appears in the sum due to an offset of positive and negative values, and the expected speed at which the noise increases is $\sqrt{n}$, where n represents the number of accumulated values. For noise signals (embedding signals) that are not independent and have a positive correlation, the measured noise is accumulated (added together) and the sum is not offset but increases continuously at a speed greater than $\sqrt{n}$. If the correlation is the positive maximum (1.0), the sum increases at a speed of n. Therefore, as the premise for the frame accumulation process, the following two conditions are established: if a mark is present, a coherent, positive correlation is maintained, even when the output for each frame is low, and the accumulation result is increased linearly; and if a mark is not present, the outputs for the frames are independent, and random walk appears in the accumulation result. The independent randomness in the second feature is an especially important property, since it is used to select the threshold value used to determine whether a mark is present. Generally, however, a motion picture has a strong positive correlation because the contents of successive frames are similar, and the outputs for these frames, therefore, are not mutually independent.

According to one method of the present invention, in order to ensure the availability of independent randomness, a sign to accumulate the frame output is forcibly inverted in accordance with the time rule, and the positive correlation between frames is canceled and is changed to a negative correlation. In order to effect the detection, the embedding side inverts an embedding sign (for direction) in accordance with the same time rule. In addition to the above case, an explanation will now be given for a method used to detect an electronic watermark when the motion picture reproduction speed is changed and a shift relative to the time rule occurs.

According to the present invention, the history of shift positions is employed in order to ensure the randomness of noise detected for an unmarked motion picture. This is based on the idea that those noises are mutually independent that are detected for those frame images having different shift positions for which the greatest effects are observed. When the depth of the history is defined as n, whether the output for a specific frame should be employed and accumulated or should be abandoned is determined in the following manner.

(1) If the shift position of the pertinent frame is included in n shift positions for frames that were employed in the past, the output for the pertinent frame is abandoned.

(2) If the shift position of the pertinent frame is included, the output for that frame is employed and accumulated, and is also added to the history of shift positions.

In this manner, the randomness of noises is maintained in the process for accumulating n frames, in the past, from unmarked motion pictures.

So long as the depth of the history of shift positions matches the upper limit for the number of accumulations, noises that do not correlate with each other can be accumulated. In the embedding process, the embedding position must be changed as needed to vary the shift position. Otherwise, the same shift position will continue to apply, so that the accumulation process does not function at all and a low signal can not be saved. Since for the above method the time rule is not used, the processing does not depend on the motion picture reproduction speed, and if the speed is changed, the accumulation process will continue to be performed correctly. Therefore, the problem concerning time changes can be resolved. Further, if the shift position is varied by changing the embedding position at intervals of one I frame each at the most, the observation of each I frame will be totally employed for the accumulation process, and the efficiency for the accumulation process is higher than the bucket division method. The ordering of the accumulation process will now be explained.

In order to further enhance the efficiency of the accumulation process, according to one method, first, strong signals are accumulated, for which a detection mask Ms, for position synchronization, and a detection mask Mb, for bit interpretation, are independently prepared, and an "order table" is employed to determine the accumulation order. This method is used as follows.

(1) First, offset position O, which produces the maximum effect, is selected using the mask Ms.

(2) The effect produced by the mask Ms, the offset position O, and the B of a bit signal at the offset position O are assembled as a set.

(3) If a pair that matches the offset position O is not registered in the order table, the set in (2) is registered. The sets in the order table are arranged in the descending order of the effects obtained by the mask Ms.

(4) If a pair that matches the offset position O is a registered in the order table and if the effect produced by the mask Ms in the set in (2) is greater than that in the registered set, the order of these sets is altered.

When the Order Table is Updated:

(1) The bit signals B from the first set to the n-th set in the table are added together and the sum is compared with a threshold value. When each bit signal corresponds to the normal distribution $N(0, 1)$, accordingly the value obtained by dividing the sum of the signals by $\sqrt{n}$ corresponds to $N(0, 1)$, so that it can be compared with the threshold value.

(2) If the sum is greater than the threshold value, it is ascertained that a mark is present, and bit interpretation is performed.

(3) If the sum is not greater than the threshold value, n is incremented by one, and the process (1) is repeated.

When it is ascertained that a mark is present, or when the sum of all the bit signals in the table does not exceed the threshold value, the process is moved to the next frame. Specifically, since a signal is intentionally embedded in a marked motion picture, it is anticipated that a strong effect will be produced when the detection mask Mb is applied to the image, as well as when the synchronization mask Ms is applied. Therefore, the results of the effect produced by the mask Mb are added in the descending order of the effects produced by the mask Ms, and as a result, since a weak effect (unsure) produced by the mask Mb is accumulated last, the accumulation process can be performed efficiently.

An effect is not always produced when the mask Mb is applied to an unmarked motion picture, even though a strong effect may be produced by the mask Ms, and the masks have independent values. It is anticipated, therefore, that the mask Mb will be applied at random regardless of how the mask Ms is used. Therefore, even when the reaction values of the masks Mb are added together in the descending order of reactions of the mask Ms, for the mask Mb random walk is ensured, and does not affect the threshold value that is used for the determination of the presence of a mark. It should be noted that the mutually independent masks Ms and Mb are formed using either a method according to which an area is divided into two segments, or a method according to which overlapped patterns are arranged orthogonally. In the DVD copy control system, two orthogonal masks M0 and M1 are prepared and are defined as follows.

$$Ms = M0 + M1$$

$$Mb = M0 - M1$$

To embed a bit of "0," the mask M0 is used as an embedding pattern, and to embed a bit of "1," the mask M1 is used as an embedding pattern. When either bit is embedded, detection using the mask Ms produces a positive effect, and detection using the mask Mb produces either a positive or a negative effect, depending on the embedded bit. Therefore, the interpretation of a bit can be determined by its sign. The orthogonality of the masks Ms and Mb is represented as follows.

$$Ms \cdot Mb = (M0+M1) \cdot (M0-M1) = |M0|^2 - |M1|^2 = 0$$

Figure 10:
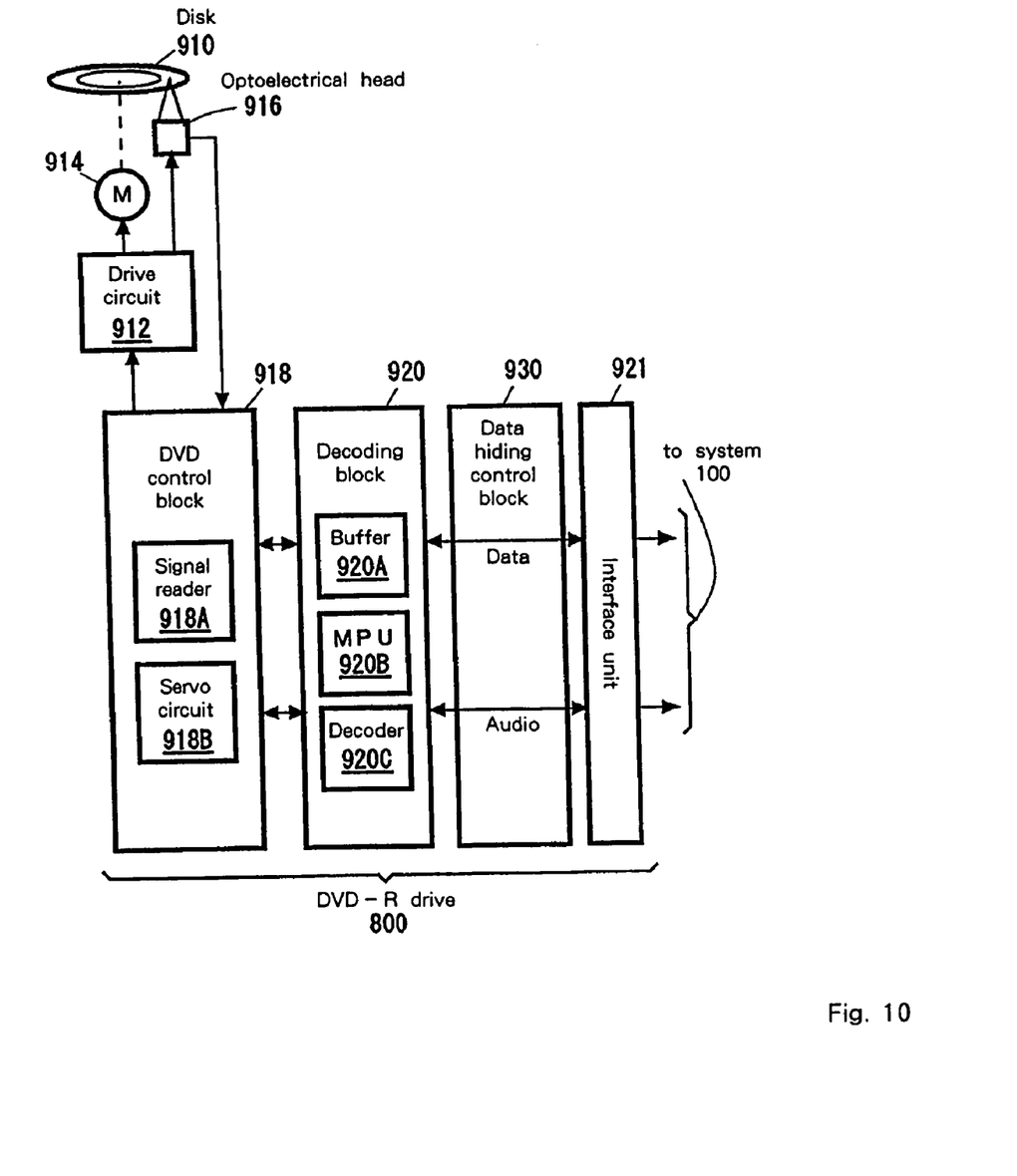
FIG. 10 is a diagram illustrating a DVD system having an electronic watermark control block according to one embodiment of the present invention.

FIG. 10 is a diagram illustrating one embodiment of a DVD-R drive system 800 including an electronic watermark control block 930. In FIG. 10, a disk 910 is rotated by a motor 914 that is connected to a drive circuit 912, and data recorded on the disk 910 are read by an optoelectrical head 916. The drive circuit 912 is operated in accordance with a command by a DVD control block 918. A signal read by the optoelectrical head 916 is transmitted to the DVD control block 918, whereat the signal is amplified, or is converted as needed, and the resultant signal is transmitted to a decoding block 920. The decoding block 920 performs modulation and demodulation of a received signal, and error correction. The DVD control block 918 includes: a servo circuit 918B, which receives either servo data recorded on the disk 910, or a control signal from the decoding block 920 to control the drive circuit 912; and a signal reader 918A.

Error correction and decoding in real time are performed for the data received by the decoding block 920 by a buffer 920A, an MPU 920B and a decoder 920C in the decoding block 920 that are connected by a common bus. The resultant data are transmitted to an electronic watermark control block 930. The electronic watermark control block 930 performs information embedding and embedded information detection, which are disclosed in the present invention. A data controller having a copying function may be added as needed. The data are transmitted from the electronic watermark control block 930 to a system 100 via an interface unit 921. The DVD-R drive system 800 can be operated independently, but may be operated while communicating with a system connected via the interface unit 921.

Figure 9:
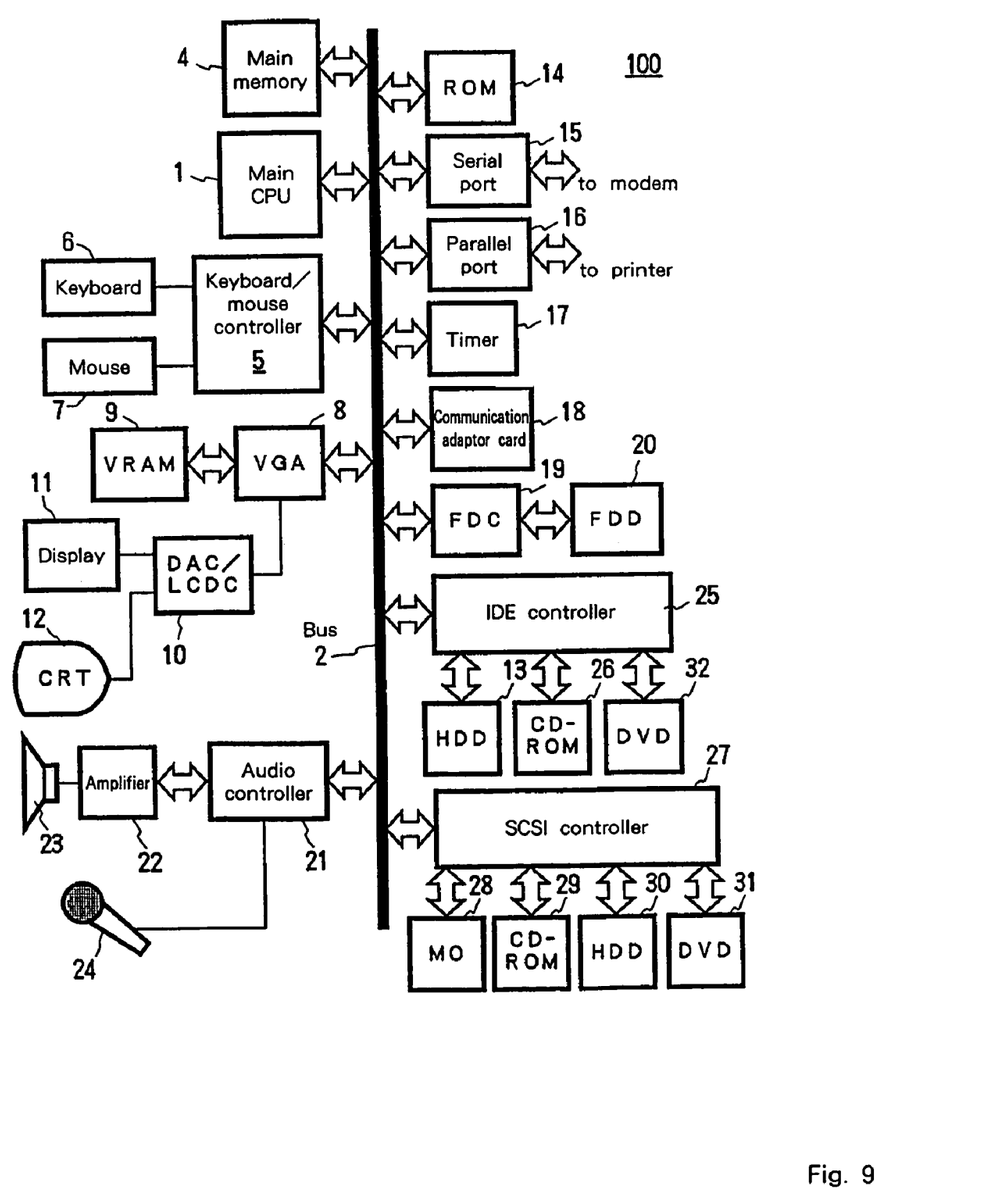
FIG. 9 is a diagram illustrating a hardware arrangement for a system of the present invention and a system that is connected thereto.

In FIG. 9 is shown an example hardware arrangement for a system 100 according to the present invention. The system 100 includes a central processing unit (CPU) 1 and a memory 4. The CPU 1 and the memory 4 are connected via a bus 2 and an IDE controller 25 to a hard disk drive 13 (or to a storage medium driver such as an MO, a CD-ROM or a DVD), which is an auxiliary storage device. Similarly, the CPU 1 and the memory 4 are connected via the bus 2 and a SCSI controller 27 to a hard disk drive 30 (or to a storage medium driver such as an MO 28, a CD-ROM 29 or a DVD 31), which is an auxiliary storage device. A floppy disk drive 20 is also connected to the bus 2 via a floppy disk controller 19.

A floppy disk is inserted into the floppy disk drive 20, and a computer program code or data, which interacts with an operating system and issues commands to the CPU 1, etc., for implementing the present invention, is stored either on the floppy disk or on a hard disk driver 13 (or another storage medium, such as an MO, a CD-ROM or a DVD) and in a ROM 14, and is loaded into the memory 4 for execution. The computer program code may be compressed, or may be divided into a plurality of segments and stored on a plurality of media.

The system 100 further includes user interface hardware components, such as a pointing device 7 (a mouse or a joystick) or a keyboard 6 for data entry, and a display 12 for providing visual data for a user. A printer and a modem can be connected to the system 100 via a parallel port 16 and a serial port 15, respectively. The system 100 can also be connected to a network via the serial port 15, the modem or a communication adaptor 18 (an ethernet or a token ring card) for communication with other computers. A remote controlled transceiver may be connected to the serial port 15 or to the parallel port 16 for the exchange of data using infrared rays or electric waves.

Via an amplifier 22, a loudspeaker 23 receives an analog audio signal, which is obtained by D/A (digital/analog) conversion performed by an audio controller 21, and outputs the audio as sound signal. The audio controller 21 receives audio data from a microphone 24 and performs an A/D (analog/digital) conversion of it, and also fetches external audio data.

It can be easily understood that the system 100, which can be connected to or communicate with the DVD-R drive system 800, of the present invention may be provided as an ordinary personal computer (PC), a workstation, a notebook PC, a palmtop PC, a network computer, a home electric appliance, such as a television that incorporates a computer, a game machine having a communication function, a telephone, a facsimile machine, a portable telephone, a PHS, a communication terminal, including a personal digital assistant, having a communication function, or a combination of such devices.

Figure 11:
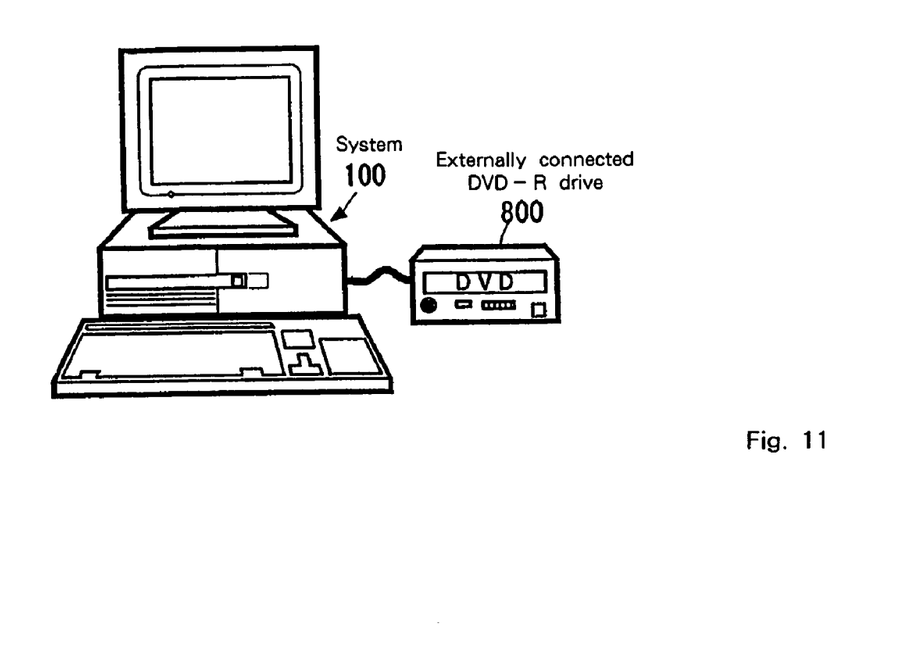
FIG. 11 is a diagram showing the DVD system externally connected to a system 100.
Figure 12:
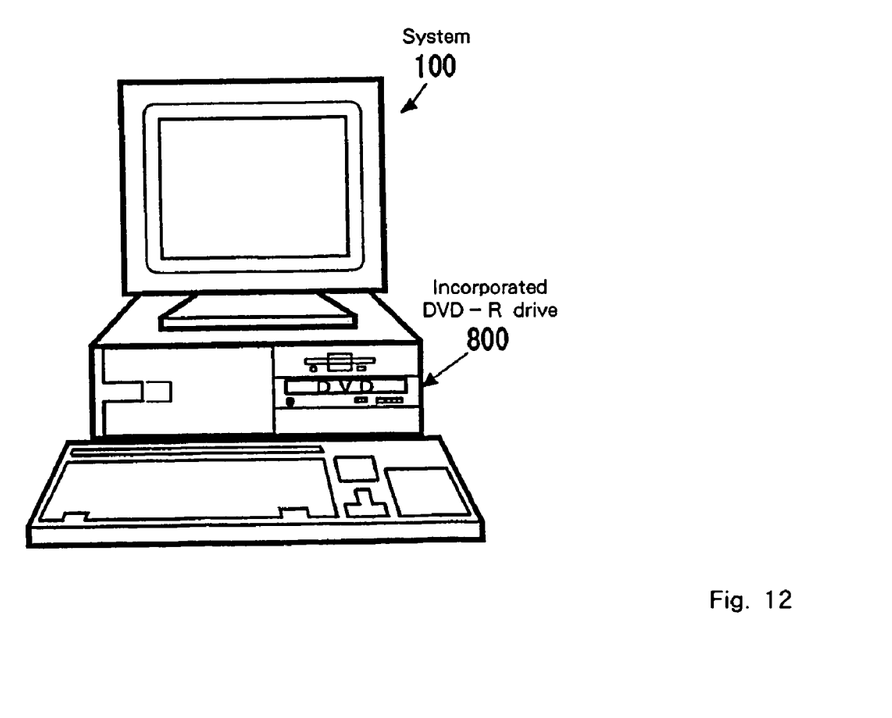
FIG. 12 is a diagram showing the DVD system incorporated in the system 100.

In FIG. 11 is shown the DVD-R drive system 800 that is externally connected to a data processing system 100, and in FIG. 12 is shown the DVD-R drive system 800 that is incorporated in a data processing system 100.

What is claimed is:

1. A motion picture electronic watermark detection system, for employing statistical observation of frames to detect embedded information, comprising:
   (1) means for accumulating values through observation of frames, separating first signals from signals for expressing information and employing signals that express information in the descending order of the intensities of said first signals;
   (2) means for comparing the accumulated values through observation with threshold values that vary in accordance with said accumulated values; and
   (3) means for employing the comparison results to detect said embedded information.

2. The motion picture electronic watermark detection system according to claim 1, which normalizes the values through observation of frames and accumulates the normalized values.

3. The motion picture electronic watermark detection system according to claim 1, wherein before accumulating said values obtained through observation of frames, said means (1) changes the signs of said values.

4. The motion picture electronic watermark detection system according to claim 1, wherein at intervals of half a sign inversion cycle, said means (1) inverts the signs of said values obtained through observation of frames and accumulates the sign inverted values.

5. The motion picture electronic watermark detection system according to claim 1, wherein at intervals of one quarter of said sign inversion cycle, said means (1) stores all values obtained through observation of frames in two accumulators A and B in the order addition for A, addition for B subtraction for A and subtraction for B.

6. The motion picture electronic watermark detection system according to claim 1, wherein said means (1) prepares two accumulators A and B, and accumulates values obtained by observation of frames in said accumulator A at intervals of one quareter of said sign inversion cycle, in the order addition for A, addition for A, subtraction for A and subtraction for A, and in parallel to this process, accumulates values obtained by the observation of frames in said accumulator B the order addition for B, addition for B, subtraction for B and subtraction for B.

7. The motion picture electronic watermark detection system according to claim 6, further comprising means for, when a bias exists in the signs of values accumulated in said two accumulators, providing an upper limit for said bias.

8. The motion picture electronic watermark detection system according to claim 1, wherein said means (1) accumulates values through observation of frames and separates first signals from signals for expressing information and employing signals that express information in the descending order of the intensities of said first signals, (2) uses a periodical detection mask that does not depend on relative positions, when information is embedded and when said information is detected.

9. The motion picture electronic watermark detection system according to claim 1, wherein said means (1) removes an overlapping positional relationship using a history of a relative positional relationship between frames, when information is embedded and when said information is detected, so that a correlation existing among sequential frames is removed and values are accumulated through observation of said frames.

10. The motion picture electronic watermark detection system according to claim 1, wherein said means (1) uses multiple masks to embed and detect information, and (2) removes duplicate values obtained from the same mask, so that a correlation existing among sequential frames is removed and values are accumulated through observation of said frames.

11. The motion picture electronic watermark detection system according to claim 1, wherein said means (1) prepares two accumulators A and B, and accumulates values obtained by observation of frames in said accumulator A at intervals of one quarter of said sign inversion cycle, in the order addition for A, addition for A, subtraction fox A and subtraction for A, and in parallel to this process, accumulates values obtained by the observation of frames in said accumulator B the order addition for B, addition for B, subtraction for B and subtraction for B and further comprising means for, in the event a bias exists in the signs of values accumulated in said two accumulators, providing an upper limit for said bias.

12. A motion picture electronic watermark detection method for employing statistical information in frames comprising the steps of:
 (1) accumulating values through observation of frames and separating first signals from signals for expressing information and employing signals that express information in the descending order of the intensities of said first signals;
 (2) comparing the accumulated values through observation with threshold values that vary in accordance with said accumulated values; and
 (3) employing the comparison results to detect said embedded information.

13. A recording medium for storing a motion picture electronic watermark detection system, for employing statistical observation of frames to detect embedded information, comprising:
 (1) a function for accumulating values through observation of frames and separating first signals from signals for expressing information and employing signals that express information in the descending order of the intensities of said first signals;
 (2) a function for comparing the accumulated values through observation with threshold values that vary in accordance with said accumulated values; and
 (3) a function for employing the comparison results to detect said embedded information.

14. A DVD system comprising a motor for a rotating disk; a pickup for reading and writing a signal on said disk; a drive circuit for controlling said motor and said pickup; a DVD control block for issuing a command to said drive circuit; a decoding block for performing signal conversion and error correction; an electronic watermark control block for embedding information or detecting embedded information; and an interface unit for communicating with an external device; said electronic watermark control block comprising:
 (1) means for accumulating values through observation of frames and separating first signals from signals for expressing information and employing signals that express information in the descending order of the intensities of said first signals;
 (2) means for comparing said accumulated values through observation with threshold values that vary in accordance with said accumulated values;
 (3) means for employing the comparison results to detect said embedded information.

15. A computer program product comprising a computer useable medium having computer readable program code means embodied therein for causing motion picture electronic watermark detection by employing statistical observation of frames to detect embedded information, said computer readable program code means in said computer program product comprising computer readable program code means for causing a computer to effect:
 (1) accumulating values through evaluation of frames and separating first signals from signals for expressing information and employing signals that express information in the descending order of the intensities of said first signals;
 (2) comparing said accumulated values through observation with threshold values that vary in accordance with said accumulated values; and (3) employing the comparison results to detect said embedded information and wherein in said accumulating of values through the observation of frames, first signals are separated from signals for expressing information, and signals are employed that express information in the descending order of the intensities of said first signals.

* * * * *